United States Patent [19]

Kobayashi et al.

[11] 4,409,623

[45] Oct. 11, 1983

[54] METHOD AND EQUIPMENT FOR PROCESSING GRAY SCALE FACSIMILE SIGNAL

[75] Inventors: Makoto Kobayashi, Yokosuka; Tetsuji Yamamoto; Yoshihiro Jimbo, both of Yokohama, all of Japan

[73] Assignee: Nippon Telegraph & Telephone Public Corporation, Tokyo, Japan

[21] Appl. No.: 342,548

[22] Filed: Jan. 25, 1982

[30] Foreign Application Priority Data

Jan. 31, 1981 [JP] Japan .................................. 56-12233
Jan. 31, 1981 [JP] Japan .................................. 56-12234
Apr. 20, 1981 [JP] Japan .................................. 56-59505

[51] Int. Cl.$^3$ ............................................. H04N 7/12
[52] U.S. Cl. .................................... 358/261; 358/260
[58] Field of Search ............... 358/260, 261, 263, 283, 358/282, 138, 284, 280, 133

[56] References Cited

U.S. PATENT DOCUMENTS 4,205,341  5/1980  Mitsuya et al. ..................... 358/260

Primary Examiner—Joseph A. Orsino, Jr.
Attorney, Agent, or Firm—Pollock, Vande Sande & Priddy

[57] ABSTRACT

A gray scale facsimile signal is divided into a plurality of block signals, each composed of a plurality of picture element signals. For each block signal are obtained binary space information indicating whether the level of each picture element signal is higher or lower than a threshold value, mean gradation information of the picture element signals having the levels above the threshold value and mean gradation information of the picture element signals having levels below the threshold value. When the difference between the two pieces of mean gradation information representing the gradation of the block signal is smaller than a predetermined value and/or when the number of picture element signals of the levels either higher or lower the threshold value is smaller than a predetermined value, the block signal is represented by one of the two pieces of gradation information and the entire space information of the block signal is set to one value of the binary space information. The space information thus obtained is coded in the same manner as conventional binary facsimile signals and the gradation information is coded in accordance with the run length of successive blocks of the same gradation information. The coded data of the space information and the coded data of the gradation information are combined and delivered out.

14 Claims, 31 Drawing Figures

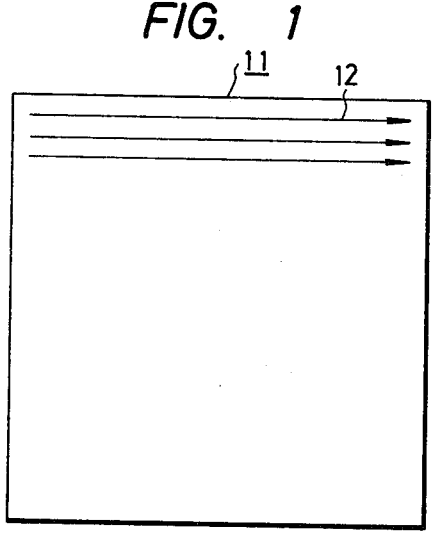

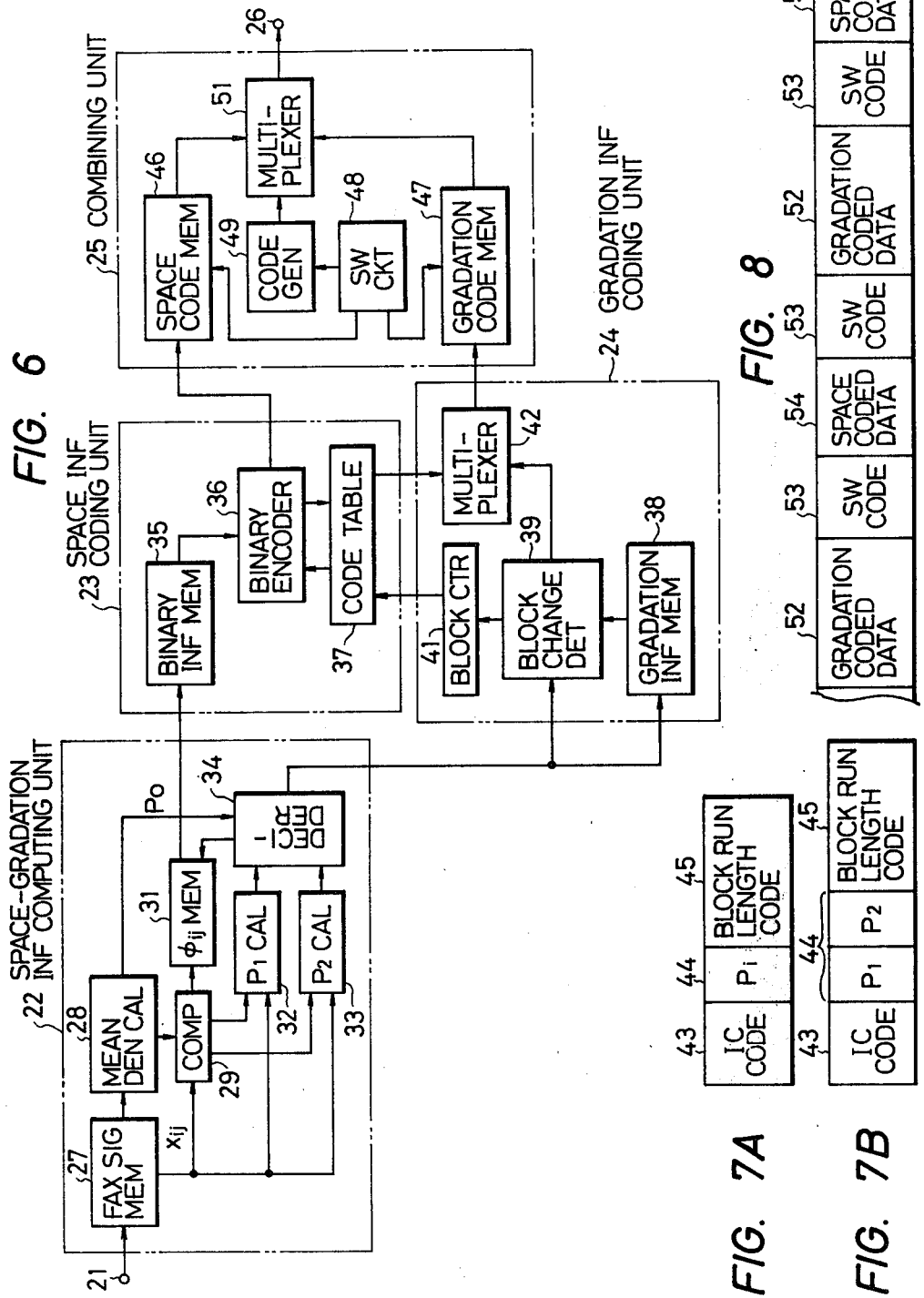

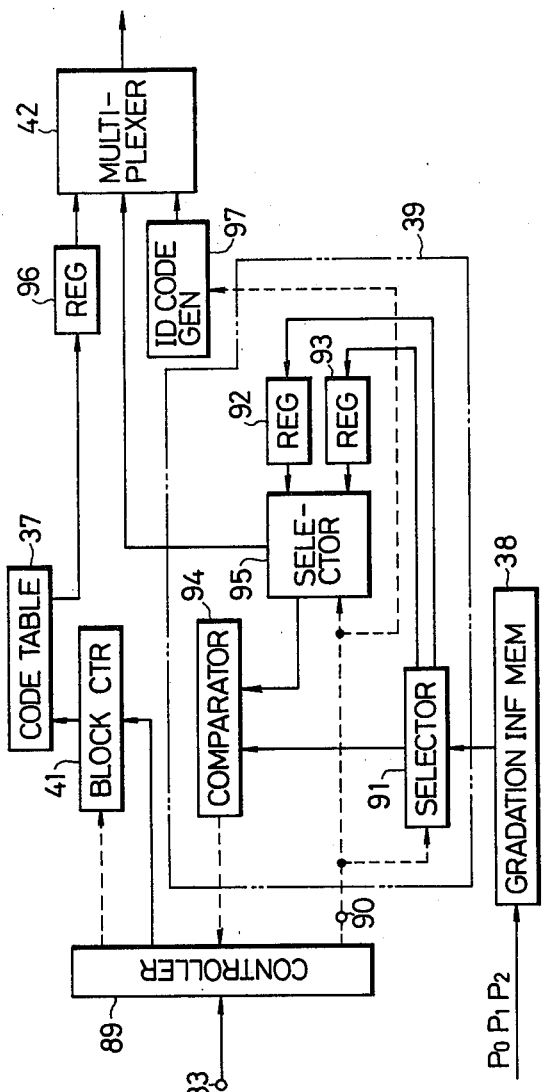
FIG. 10
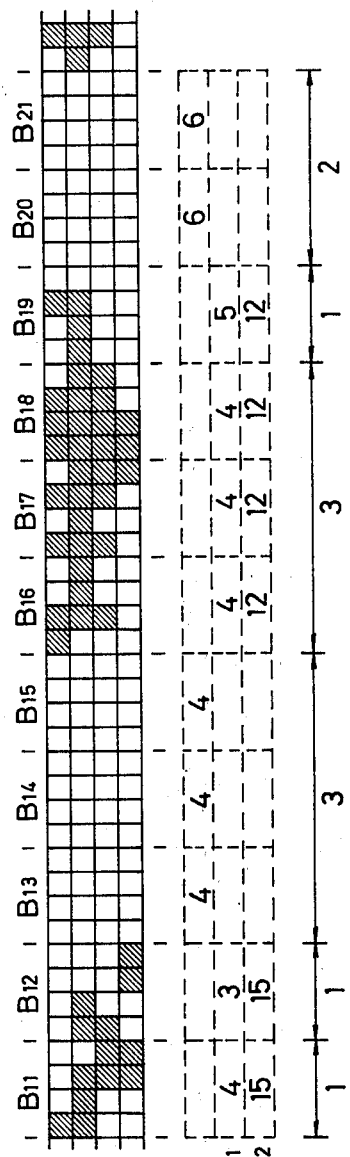
FIG. 11A
FIG. 11B
FIG. 11C

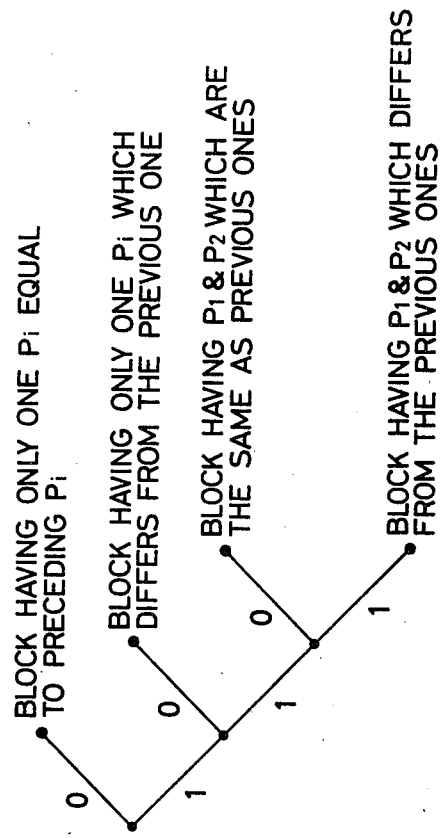
FIG. 23
| MODIFIED WYLE CODE | |
|---|---|
| BLOCK RUN LENGTH | CODE (*: SIMPLE BINARY) |
| 1~2 | 0* |
| 3~6 | 10** |
| 7~14 | 110*** |
| 15~30 | 1110**** |
| 31~62 | 11110***** |
| 63~126 | 111110****** |
| 127~254 | 1111110******* |
| 255~510 | 11111110******** |
FIG. 24
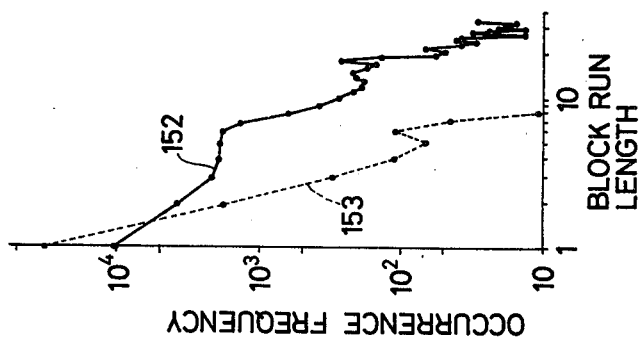
FIG. 22

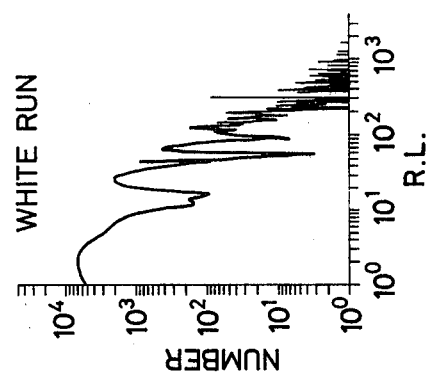
FIG. 27A
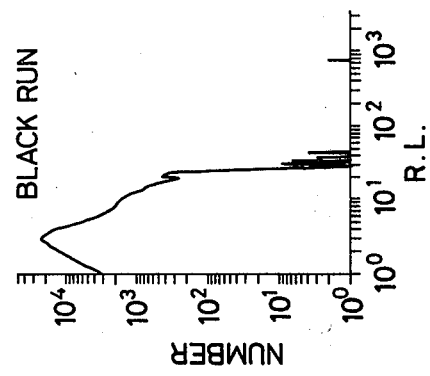
FIG. 27B
FIG. 25
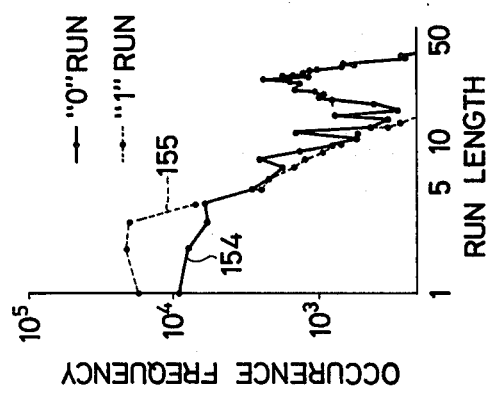
FIG. 26

METHOD AND EQUIPMENT FOR PROCESSING GRAY SCALE FACSIMILE SIGNAL

BACKGROUND OF THE INVENTION

The present invention relates to a gray scale facsimile signal processing method and equipment, and more particularly to such method and equipment for coding a facsimile signal having a gray scale component (hereinafter referred to as a gray scale facsimile signal), obtained by scanning a picture containing a gray scale, such as a photograph, and decoding the coded information.

Known as conventional methods for coding gray scale picture signal in a manner to compress its frequency band are (1) a predictive coding method, (2) a bit plane method, (3) a half-tone display method and (4) a block coding method.

The coding method (1) is one that predicts the gradation of each picture element signal from the gradation of surrounding picture elements and codes the difference between the predicted signal and an actual picture element signal. The number of surrounding picture elements employed for the prediction is usually in the range of between one to ten. In general, the more the surrounding picture elements are used, the higher the accuracy of prediction improves and the more the difference signal approaches zero, while the prediction processing becomes more and more complex. The coding efficiency of this method is not so high, approximately in the range of 1.5 to 2.0 bits/picture element. In addition, an enormous table (memory) is needed for the prediction processing. Conventional binary facsimile signal coding methods are the modified Huffman coding method and the modified Read coding method internationally standardized by CCITT. The prior art predictive coding method is difficult to apply to facsimile equipment employing such international standard coding methods.

The bit plane method (2) is one that renders the amplitude value of the gray scale signal into a PCM code for each picture element signal and encodes binary (1, 0) pictures of bit planes of the same weight by one of the abovementioned international standard coding methods. The coding efficiency of this method is about 2 to 3 bits/picture element, which is lower than those of the other coding methods. Furthermore, the binary signal of the bit plane of the most significant bit becomes identical with a binary facsimile signal which ignores the gray scale, but as the bit plane of the least significant bit is approached, the binary signal gradually becomes a noise and does not match with the abovesaid international standard coding method.

The half-tone display method (3) is one that divides a picture frame into a plurality of blocks, selects the ratio between the number of black picture elements and the number of white picture elements for each block in a manner to obtain the mean gradation of the block and represents the half tone according to the binary definition of the white and black picture elements. According to this method, in the case where a binary signal obtained at the transmitting side is coded by the aforesaid internationally standardized coding method, a gradation signal is transmitted as it is and, at the receiving side, the gray scale is represented in accordance with the density of white and black picture elements of each block. With this method, since the mean gradation is provided for each block in terms of the ratio between the number of white picture elements and the number of black picture elements in the block, the picture quality is impaired. As the binary signal usually differ widely from the binary facsimile signal in statistical property, it is difficult to apply the aforementioned international standard coding methods.

The block coding method (4) is one that is disclosed, for instance, in U.S. Pat. No. 4,205,341 entitled "Picture Signal Coding Apparatus", issued on May 27, 1980. According to this method, a picture frame is divided into a plurality of blocks, in each of which a binary resolution signal is obtained on the basis of the mean gradation of the block. The block is represented by two gradation signals of the mean gradation of picture element signals corresponding to one of the two values of the resolution signal and the mean gradation of picture element signals corresponding to the other and the resolution signal. The coding efficiency of this method is about 1 bit/picture element and is still insufficient. Moreover, this method is not well suitable for use with the aforesaid international standard coding methods.

SUMMARY OF THE INVENTION

It is an object of the present invention to provide a method and equipment for processing a gray scale facsimile signal which permit efficient coding.

Another object of the present invention is to provide a method and equipment for processing a gray scale facsimile signal which are well conformable with the international standard coding methods.

Another object of the present invention is to provide a method and equipment for processing a gray scale facsimile signal which permit the use of existing facsimile apparatus and hence are economically advantageous.

Yet another object of the present invention is to provide a method and equipment for processing a gray scale facsimile signal which are capable of producing a reconstructed picture of excellent quality.

According to the present invention, the gray scale facsimile signal is divided into a plurality of block signals, each of which is a facsimile signal for one of a plurality of blocks into which a frame of the original picture of the gray scale facsimile signal is divided, each of the blocks being composed of a plurality of picture elements. The block signals thus obtained are each represented by two pieces of gradation information and binary space information corresponding to each picture element. The two pieces of gradation information are the mean gradation of a group of picture elements of lower gradation than the mean gradation of the corresponding block and the mean gradation of a group of picture elements of higher gradation. The space information indicates whether each picture element signal belongs to the lower gradation picture element group or the higher gradation picture element group. In the event that there are substantially no differences between the two pieces of gradation information representing the block signal, only one pieces of gradation information is used and all the space information of the block is set to one value of its binary signal, preferably to a value representing white in the picture. Similarly, also when the number of picture elements belonging to either one of the lower and higher gradation picture element groups is very small, the gradation information of the block signal is represented by only the mean gradation information of the other picture element group and all the space information is given one value of the binary signal, preferably to the value indicating white in the picture. In such cases where the two pieces of gradation information are substantially the same as each other, and where the number of picture elements of either one of the groups is very small, the abovesaid processing may be omitted for one of them. The former processing eliminates the influence of noises of the intermediate level which are distributed over substantially the entire area of each block. The latter processing removes small noises which exist locally in the block.

The space information thus obtained for a plurality of block signals is coded into binary codes in the order of occurrence of original facsimile signals. For this binary coding, it is possible to use such internationally standardized codes as the modified Huffman code, the modified Read code, etc. employed in prior art binary facsimile signal coding methods. Especially, also in the case of the block signal represented by only one piece of gradation information, the same space information is provided for each picture element as described previously, so that the distribution of the space information becomes similar to that obtainable when an original picture frame is divided in terms of binary representation of black and white, that is, the distribution of binary signals of binary facsimile information. In the case of the modified Huffman code, the black and white picture elements are each coded in accordance with its run length and the code of high frequency of occurrence is given a small code length; namely, efficient coding is performed taking into account the statistical property of each picture element so that the number of bits necessary for its code may be small. A continuation of the space information is similar in distribution to the binary facsimile signal as mentioned above and their statistical property of continuity of the binary code becomes similar to each other. Accordingly, the space information can be efficiently coded when it is coded by the international standard coding method in such an order referred to previously. That is to say, according to the present invention, coding and decoding can be effectively carried out through utilization of the present techniques and existing equipment.

Also the gradation information is coded as required; namely, the gradation information is coded into gradation information and a code indicating the number of successive blocks of the same information value (hereinafter referred to as the block run length). In this case, the arrangement of the gradation information is identical with the arrangement of blocks of the original picture frame and, consequently, the statistical property of the block run length is very similar to the statistical property of the black and white run lengths of the binary facsimile signal. Accordingly, the block run length can be coded using the same code table as is employed for coding the space information. The gradation information can be coded efficiently by modifying the Wyle code in conformity with this coding.

When to code the gradation information, if identification information is used for indicating whether the block signal is represented by one or two pieces of representative gradation information, subsequent decoding processing can be made easy. In the case of coding the gradation information, it is also possible that if the gradation information of the block signal is identical with the representative gradation information of the immediately preceding block, an identification code indicating it is sent out and, if not, an identification code indicating it and representative gradation information are sent out.

Furthermore, by sending out the code of the space information and the gradation information (the information itself or coded information) alternately every predetermined number of blocks and by inserting a switching signal between them, it is possible to facilitate real time processing for coding and decoding.

The decoding can be achieved by reversing the coding procedure.

In the case of a facsimile receiver which is able to reconstruct only a binary (black-white) facsimile signal, a half-tone signal can be obtained by providing an adapter therefor. That is to say, the gradation information is separated from a received code train and, in accordance with the gradation information, a predetermined dot pattern signal is produced which is composed of binary signals of one block signal. This dot pattern signal is such that the black and white mean density of the reconstructed picture of the binary signals coincides with the corresponding gradation information. The dot pattern signal and the space information code corresponding to the block of the representative gradation information are decoded and then ANDed to obtain a decoded output. In the case of two pieces for representative gradation information being used, dot pattern information corresponding to each gradation information and the decoded space information are ANDed and the AND outputs thus obtained are ORed to obtain the decoded output. Alternatively, one dot pattern is ORed with the two pieces of representative gradation information and the OR output is ANDed with the decoded space information to provide the decoded output. With such processing, a black and white binary picture is reconstructed but the mean density of each block varies with the gray scale of the original picture, resulting in the reconstructed picture appearing to have been imported the gray scale as a whole.

BRIEF DESCRIPTION OF THE DRAWINGS

FIG. 1 is a diagram schematically showing the scanning of an original picture;

FIG. 2 is a diagram showing the division of the original into a plurality of blocks;

FIG. 3 is a diagram illustrating the arrangement of picture elements in one block;

FIG. 4 is a diagram showing, by way of example, picture element signals of the respective picture elements of one block;

FIG. 5 is a diagram showing, by way of example, space information for the block depicted in FIG. 4;

FIG. 6 is a block diagram illustrating an example of a coding processing section of the gray scale facsimile signal processing equipment of the present invention;

FIGS. 7A and 7B are diagrams showing, by way of example, coded data formats;

FIG. 8 is a diagram showing the coded data format;

FIG. 10 is a block diagram illustrating a specific example of a gradation information coding section 14 used in FIG. 6;

FIG. 11A is a diagram showing an example of space information;

FIG. 11B is a diagram showing, by way of example, representative gradation information of the space information depicted in FIG. 11A;

FIG. 11C is a diagram showing block run lengths of the gradation information depicted in FIG. 11B;

FIG. 16 is a block diagram illustrating an example of the gray scale facsimile signal decoding equipment of the present invention adapted to perform processing under program control;

FIG. 22 is a graph showing, by way of example, the relationship between the block run length and the frequency of occurrence thereof;

FIG. 23 is a diagram showing an example of a code which is preferred for coding of gradation;

FIG. 24 is a diagram explanatory of another example of the gradation coding;

FIG. 25 is a diagram showing an example of the coding of the gradation information of FIG. 11B by the coding method depicted in FIG. 24;

FIG. 26 is a graph showing, by way of example, the relationship between the run length of the space information and its frequency of occurrence; and FIGS. 27A and 27B are graphs respectively showing the run length and frequency of occurrence of a standard binary facsimile signal.

DESCRIPTION OF THE PREFERRED EMBODIMENTS

Figure 9:
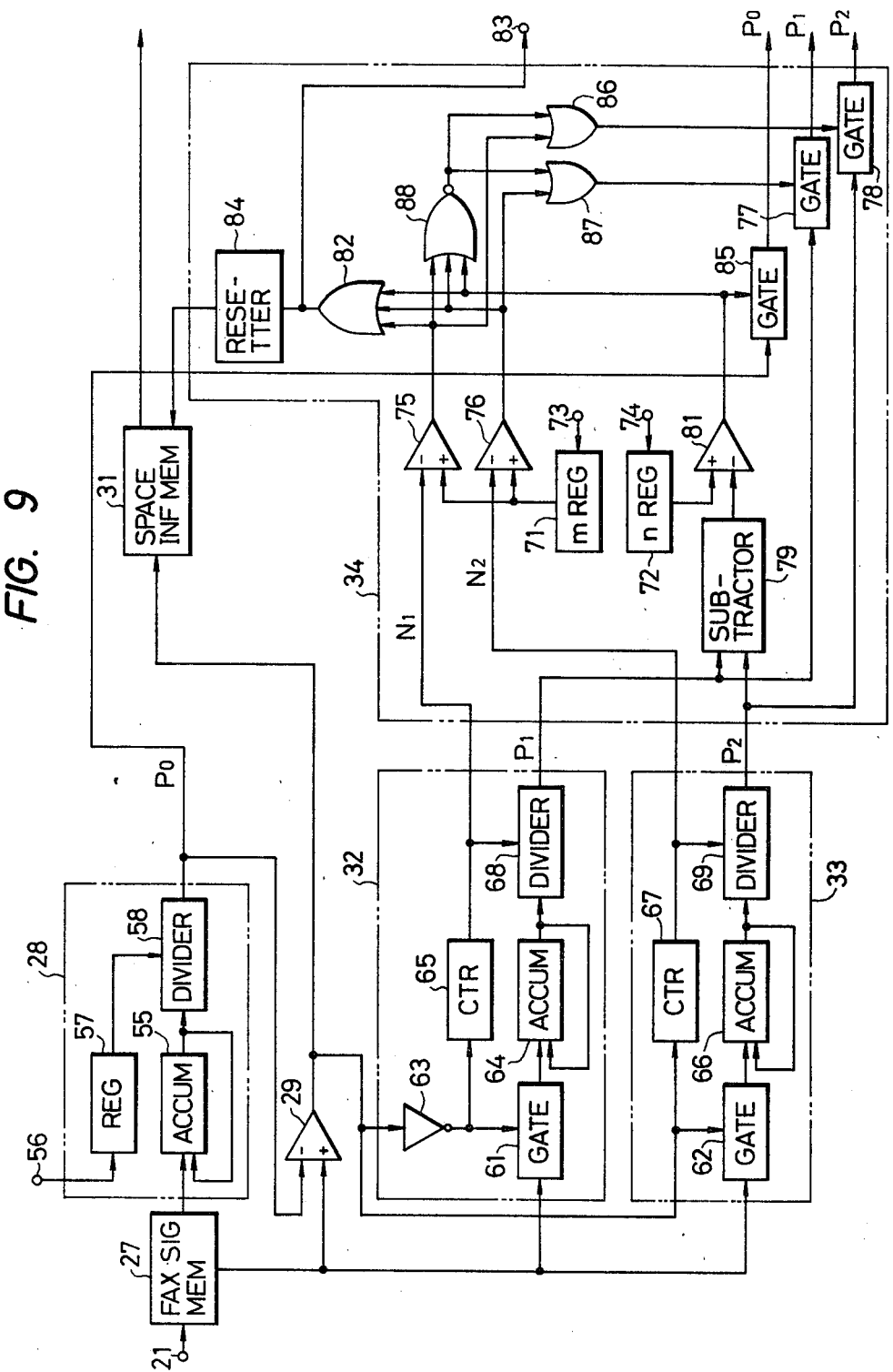
FIG. 9 is a block diagram illustraeting a specific example of a space-gradation information computing section 22 utilized in FIG. 6.

In the facsimile system it is common practice to obtain an arrangement of picture element signals by optically scanning an original (an original picture) 11, for example, in a lateral direction from its left upper corner as shown in FIG. 1 and converting respective points on a main scanning line 12, that is, picture elements into electrical signals. In common binary facsimile systems, each picture element signal assumes on a value "0" or "1" depending on whether it represents white or black. But the present invention applies to a facsimile signal containing a gray scale component and each picture element is converted into a picture element signal of an amplitude which varies with the density of the picture element, for instance, lowers or rises with a decrease or increase in the density. The main scanning line 12 is shifted down, that is, the picture 11 is subjected to sub-scanning to thereby scan the entire area of the picture.

In the present invention the facsimile signal containing the gray scale component (hereinafter referred to as the gray scale facsimile signal) thus obtained by scanning the picture 11 is divided into block signals. That is to say, the original picture 11 is divided, for instance, into M×N blocks $B_{rs}$ (r=1, 2, ..., M and s=1, 2, ..., N) as shown in FIG. 2. The blocks $B_{rs}$ each consists of K×L picture elements $E_{ij}$ (i=1, 2, ..., K and j=1, 2, ..., L) as depicted in FIG. 3. The gray scale facsimile signal of one original picture is divided into signals of the respective blocks $B_{rs}$ (which signals will hereinafter be referred to as block signals). Now, letting picture element signals of the picture elements $E_{11}$, $E_{12}$, ..., $E_{KL}$ of one block be represented by $x_{11}$, $x_{12}$, ..., $x_{KL}$, the block signal is composed of the picture element signals $x_{11}$, $x_{12}$, ..., $x_{KL}$.

For each block $B_{rs}$ is detected its mean gradation $P_0$. The mean gradation $P_0$ can be obtained, for example, by the following operation:

$$P_0 = \frac{1}{K \cdot L} \sum_{i=1, j=1}^{i=K, j=L} x_{ij} \tag{1}$$

In the block the picture elements are each assigned "0" or "1" depending on whether their density is lower or higher than the mean gradation $P_0$, obtaining space information $\phi_{ij}$.

$$\phi_{ij} = \begin{cases} 0 \text{ for } x_{ij} \leq P_0 \\ 1 \text{ for } x_{ij} > P_0 \end{cases} \tag{2}$$

For instance, in the case where the block signals $x_{11}$, $x_{12}$, ..., $x_{KL}$ of a certain block are 12, 11, 6, ..., 1 as depicted in FIG. 4 (in which K=4 and L=4), the mean gradation $P_0$ is 7 and the space information $\phi_{ij}$ of each picture element is such as illustrated in FIG. 5 in which the picture element signals $x_{11}$, $x_{12}$, $x_{22}$, $x_{23}$, $x_{24}$ and $x_{32}$ of picture element information $x_{ij}$ larger than 7 are given "1" and the other picture elements are given "0".

Further, for each block are obtained a mean gradation $P_1$ of the picture elements of lower density than the mean gradation $P_0$ of each block, i.e. $E_{13}$, $E_{14}$, $E_{21}$, $E_{31}$, $E_{33}$, $E_{34}$, $E_{41}$, $E_{42}$, $E_{43}$ and $E_{44}$ in the example of FIG. 4, and a mean gradation $P_2$ of the picture elements of higher density than the mean gradation $P_0$.

$$P_1 = \frac{1}{N_1} \sum_{x_{ij} \leq P_0} x_{ij} \text{ provided } N_1 = \sum_{i,j}^{K,L} \overline{\phi_{ij}} \tag{3}$$

$$P_2 = \frac{1}{N_2} \sum_{x_{ij} > P_0} x_{ij} \text{ provided } N_2 = \sum_{i,j}^{K,L} \phi_{ij} \tag{4}$$

Next, it is detected whether the mean gradations $P_1$ and $P_2$ are substantially equal to each other and whether either one of the numbers $N_1$ and $N_2$ of the picture elements of lower and higher density than the mean gradation $P_0$ is very larger than the other. That is to say, a positive integer n smaller than the value of the highest possible level of the picture element signal $x_{ij}$ and a positive integer m smaller than the number of picture elements K×L of one block $B_{rs}$ are introduced. When $|P_1 - P_2| \leq n$ is satisfied, the block is represented by the mean gradation $P_0$ alone deciding that the gradation of the block is distributed substantially uniformly over the entire area thereof. When $N_1 \leq m$ or $N_2 \leq m$ is satisfied, the block is represented by the mean gradation $P_2$ or $P_1$ alone deciding that the gradation distribution of the block is uniform. In the other cases, the gradation of the block is represented by the two mean gradations $P_1$ and $P_2$. When the gradation information of the block is represented by one of the mean gradations $P_0$, $P_1$ and $P_2$, the space information $\phi_{ij}$ of the block is all "0".

Such space information $\phi_{ij}$ is encoded into binary codes in the order of scanning shown in FIG. 1 as in the case of the prior art and one or two of the gradation information $P_0$, $P_1$ and $P_3$ are encoded in tthe order of arrangement of the blocks depicted in FIG. 2. A description will be given later of the procedure of this encoding.

FIG. 6 illustrates a basic arrangement for coding processing in the present invention. The gray scale facsimile signal from an input terminal 21 is applied to a space-gradation information computing unit 22, wherein the space information $\phi_{ij}$ and the gradation information $P_0$, $P_1$ and $P_2$ are obtained. The space information $\phi_{ij}$ is encoded by a space information coding unit 23, whereas the gradation information is encoded by a gradation information coding unit 24. The space information and the gradation information thus coded are combined by a combining unit 25, thereafter being delivered as coded data from an output terminal 26.

In the space-gradation information computing unit 22, in the case of the block $B_{rs}$ consisting of the $K \times L$ picture elements, gray scale facsimile signals of at least K consecutive main scanning lines are stored in a facsimile signal memory 27 so as to produce block signals. From the facsimile signal memory 27 are read out facsimile signals of one block, which are provided to a mean density calculator 28 for calculating the mean gradation $P_0$ by the aforesaid expression (1). The output from the mean density calculator 28 is applied to a comparator 29, wherein the mean gradation $P_0$ is compared with each picture element signal $x_{ij}$ of the block signal. From the comparator 29 is yielded for each picture element the space information $\phi_{ij}$ which is "0" or "1" according to the result of the comparison as shown by the expression (2). The space information $\phi_{ij}$ thus obtained is stored in a space information memory 31. At the same time, the picture element signal $x_{ij}$ the picture element information $x_{ij}$ of which is smaller than or equal to the mean gradation $P_0$ is applied to a $P_1$ calculator 32 and the picture element signal $x_{ij}$ the picture element information $x_{ij}$ of which is smaller than $P_0$ is applied to a $P_2$ calculator 33. In the $P_1$ calculator 32 is conducted the operation of the expression (3) to obtain the mean gradation $P_1$ and the number of picture elements $N_1$ and in the $P_2$ calculator 33 are obtained the mean gradation $P_2$ and the number of picture elements $N_2$. The outputs $P_0$, $P_1$, $N_1$, $P_2$ and $N_2$ from the calculators 28, 32 and 33 are fed to a decider 34, wherein it is checked whether they satisfy the conditions $|P_1 - P_2| \leq n$, $N_1 \leq m$ and $N_2 \leq m$. When one of these conditions is satisfied, the block is decided to be an A type and that one of the mean gradations $P_0$, $P_2$ and $P_1$ corresponding thereto and identification information indicating the A type are provided from the decider 34 to the gradation information coding unit 24. At this time, all the space information $\phi_{ij}$ of the corresponding block stored in the space information memory 31 is made to the "0" and then supplied to the space information coding unit 23. When none of the conditions $|P_1 - P_2| \leq n$, $N_1 \leq m$ and $N_2 \leq m$ is satisfied, the block is decided to be a B type and information indicating the B type and the two mean gradations $P_1$ and $P_2$ corresponding thereto are supplied to the gradation information coding unit 24. At the same time, the space information $\phi_{ij}$ of the corresponding block is applied from the space information memory 31 to the space information coding unit 23.

The space information coding unit 23 may be the same as that for the conventional binary facsimile signal. The space information $\phi_{ij}$ inputted to the space information coding unit 23 is stored in a binary information memory 35 at one time. The space information $\phi_{ij}$ stored in the binary information memory 35 is read out therefrom in the order of scanning of the original picture 11 shown in FIG. 1 and encoded by a binary encoder 36. The encoder 36 is to encode the input into the modified Huffman code, for instance, and detects the number of consecutive "0"s or "1"s in the space information and delivers out a code corresponding to the detected number after encoding it into space coded data by reference to a code table 37. As the binary encoder 36 and the code table 37 are known, no detailed description will be given of them. The binary encoder 36 and the code table 37 are not limited specifically to those for the modified Huffman code but may also be those for the modified Read code or other known ones.

In the gradation information coding unit 24 the gradation information inputted thereto is temporarily stored in a gradation information memory 38, from which the information is read out in the order of blocks shown in FIG. 2. The gradation information thus read out and the inputted identification code indicating the A or B type are applied to a block change detector 39 and the number of consecutive blocks of the same gradation information (hereinafter referred to as the block run length) is counted by a block counter 41. Upon detection of a change in the block gradation information, the immediately preceding gradation information (one or two), the identification code indicating the A or B type and a code into which the block run length has been encoded are delivered out as gradation coded data via a multiplexer 42 in a predetermined order. In FIG. 6 the code table for encoding the block run length is used as the code table 37 of the space information coding unit 23, too. In the case of the A type, the gradation information coding unit 24 successively delivers out an identification code field 43, one gradation information field 44 of the mean gradation information $P_i$ (i being 0, 1 or 2) and a block-run-length field 45 for the code indicating the block run length as shown in FIG. 7A. In the case of the B type, as depicted in FIG. 7B, the gradation information field 44 includes the gradation information $P_1$ and $P_2$ and the identification code of the identification code field 43 is set to "0", while it is "1" in the case of the A type. Of course, the field 45 is provided for indicating the block run length.

In the combining unit 25, the space coded data from the space information coding unit 23 is accumulated in a space code memory 46 and the gradation coded data from the gradation information coding unit 24 is accumulated in a gradation code memory 47. A switching circuit 48 is to read out the memories 46 and 47 alternately every predetermined number of blocks, for instance, N blocks in the main scanning line. Upon each switching, a code generator 49 yields a switching code. The outputs from the space code memory 46, the code generator 49 and the gradation code memory 47 are taken out by a multiplexer 51 in a predetermined order and provided to the output terminal 26. The coded data thus obtained at the output terminal 26 are, for example, N-block gradation coded data 52, a switching code 53, N-block space coded data 54, the switching code 53, the N-block gradation coded data 52, the switching code 53, the N-block space coded data 54, . . . as illustrated in FIG. 8.

FIG. 9 shows a specific example of the space-gradation information computing unit 22. Each picture element signal $x_{ij}$ in one block signal read out from the facsimile signal memory 27 is accumulated by an accumulator 55 to obtain $\Sigma x_{ij}$. The number of picture elements $K \times L$ of one block is set in a divisor register 57 via a terminal 56 and the accumulated value $\Sigma x_{ij}$ is divided by the number of picture elements $K \times L$ in a divider 58 to obtain the mean gradation information $P_0$. Each time the mean gradation information $P_0$ is obtained, the content of the accumulator 55 is reset. And when the mean gradation information $P_0$ has been obtained, each picture element signal $x_{ij}$ of the block signal used therefor is read out again from the memory 27 and applied to the comparator 29 and gates 61 and 62. The comparator 29 compares the picture element signal $x_{ij}$ and the mean gradation information $P_0$ obtained by the divider 58 and yields an output "0" or "1" depending on whether $x_{ij} \leq P_0$ or $x_{ij} > P_0$.

The space information $\phi_{ij}$ available from the comparator 29 is written in the sapce information memory 31. When the output from the comparator 29 is "0", it is inverted by an inverter 63, the output from which is applied to the gate 61 to open it. At this time, the picture element signals which satisfy the condition $x_{ij} \leq P_0$, are provided via the gate 61 to an accumulator 64, wherein they are accumulated. The output from the inverter 63 is counted by a divisor counter 65, that is to say, the aforesaid number $N_1$ is calculated. When the output from the comparator 29 is "1", the gate 62 is opened, through which the picture element signals satisfying the condition $x_{ij} > P_0$ are passed on to an accumulator 66 and, at the same time, the output from the comparator 29 is counted by a divisor counter 67. After finishing the comparing operation by the comparator 29 for the picture element signals of one block, the accumulated values of the accumulators 64 and 66 are divided by the count values $N_1$ and $N_2$ of the divisor counters 65 and 67 in dividers 68 and 69, respectively, thus obtaining the mean gradation information $P_1$ and $P_2$. After completion of such processing for each block signal, the accumulators 64 and 66 are reset.

In set registers 71 and 72 of the decider 34 are respectively set the aforementioned positive integers m and n via terminals 73 and 74. The set number m is supplied to comparators 75 and 76, wherein it is compared with the count values $N_1$ and $N_2$ of the divisor counters 65 and 67. Only when $N_1 \leq m$ and $N_2 \leq m$, the outputs from the comparators 75 and 76 are "1" and, in other cases, they are "0". The mean gradation information $P_1$ and $P_2$ obtained from the dividers 68 and 69 are respectively applied to gates 77 and 78 and a subtractor 79. In the subtractor 79, $|P_1 - P_2|$ is calculated and the calculation result is compared with the set number n of the set register 72 in a comparator 81, which provides an output "1" only when $|P_1 - P_2| \leq n$. The outputs from the comparators 75, 76 and 81 are supplied to an OR circuit 82, from which is delivered to a terminal 83, an output as the identification code distinguishing between the A type block and the B type block. The output from the OR circuit 82 is fed to a resetter 84 as well. When the input to the resetter 84 is "1", that is, in the case of the A type block, all the space information $\phi_{ij}$ of the corresponding block read out from the space information memory 31 is made "0" by the resetter 84. When the output from the comparator 81 is "1", a gate 85 is opened, through which the mean gradation information $P_0$ from the divider 58 is delivered out. The outputs from the comparators 75 and 76 are applied to OR circuits 86 and 87, respectively, and to a NOR circuit 88, too. The output from the NOR circuit 88 is fed to the OR circuits 86 and 87. Accordingly, when any one of the conditions $N_1 \leq m$, $N_2 \leq m$ and $|P_1 - P_2| \leq n$ has been satisfied, the output from the NOR circuit 88 is "0" and only when any of these conditions are not satisfied, the output from the NOR circuit 88 is "1" and the outputs from the OR circuits 87 and 86 are both "1". By the outputs the gates 77 and 78 are opened to deliver out therethrough the mean gradation information $P_1$ and $P_2$. When only the output from the comparator 75 is "1", the output from the OR circuit 86 becomes "1" to open the gate 78, through which only the mean gradation information $P_2$ is delivered out. When the output from the comparator 76 alone is "1", the output from the OR circuit 87 becomes "1" to open the gate 77, delivering out only the mean gradation information $P_1$.

The encoding apparatus of FIG. 6 and the space-gradation information computing unit 22 of FIG. 4 are each designed so that respective parts are controlled in a predetermined sequence by means of a controller, though not illustrated. The picture element signal $x_{ij}$ may be an analog signal or, for example, a PCM coded digital signal.

FIG. 10 illustrates an example of the gradation information coding unit 24. The identification code from the terminal 83 is applied to a controller 89, which is supplied with at least a clock for each block signal used for the coding operation of FIG. 6, that is, a block clock, though not shown. As described previously, the gradation information memory 38 has stored therein the gradation information from the space-gradation information computing unit 22 (FIG. 6). The gradation information read out from the gradation information memory 38 is provided to a selector 91. To the selector 91 is supplied from a terminal 90 of the controller 89 a control signal indicating whether the gradation information read out is for the A type or B type block. In either case, the gradation information is inputted to one of registers 92 and 93, say, register 92 and, in the case of the B type block, the gradation information read out next is loaded in the other register 93. The selector 91 always supplies the gradation information to a comparator 94. The control signal from the terminal 90 is applied to a selector 95, too. In the case of the A or B type block, the selector 95 applies the content of the register 92 to the comparator 94 and, in the case of the B type block, supplies the output from the register 93 to the comparator 94 when the next gradation information has been read out. In this way, the comparator 94 compares the gradation information of the block being currently read out and the gradation information of the block read out immediately before. The compared output is provided to the controller 89 and, for each comparing operation of the comparator 94, the controller 89 supplies a clock to a block counter 41 for counting. When noncoincidence has been detected, the code table 37 is read out in accordance with the content of the block counter 41 and data indicating the block run length, read out from the code table 37, is loaded in a register 96, after which the controller 89 resets the block counter 41. The control signal at the terminal 90 is fed to an identification code generator 97, too, which generates an identification code such as, for example, "1" or "0" corresponding to the A or B type block. When noncoincidence has been detected by the comparator 94, the selector 95 reads out the register 92 and applies its output to the multiplexer 42 in the cases of the A and the B type block, after which, in the case of the B type block, the selector 95 applies the content of the register 93 to the multiplexer 42. Upon detection of noncoincidence in the comparator 94, the controller 89 controls the multiplexer 42 to deliver the outputs from the identification code generator 97, the selector 95 and the register 96 in a sequential order, obtaining the gradation coded data shown in FIG. 7A or 7B.

Now, let it be assumed, for example, that the number of gradation levels of the picture element information is 16, and that one block includes 16 ($K=4$, $L=4$) picture elements. In the case where the space information is such, for instance, as shown in FIG. 11A (in which "0" and "1" are indicated by unhatched and hatched parts, respectively) and the gradation information is such as shown in FIG. 11B (in which blocks $B_{13}$, $B_{14}$ and $B_{15}$ are the A type and their gradation information is 4, blocks $B_{20}$ and $B_{21}$ are also the A type and their gradation information is 6 and blocks $B_{11}$, $B_{12}$, $B_{16}$, $B_{17}$, $B_{18}$ and $B_{19}$ are the B type and their gradation information $P_1$ and $P_2$ are respectively 4, 15; 3, 15; 4, 12; 4, 12; 4, 12; and 5, 12), the block run length is 1 for each of the blocks $B_{11}$ and $B_{12}$, 3 for the blocks $B_{13}$ to $B_{15}$, 3 for the blocks $B_{16}$ to $B_{18}$, 1 for the block $B_{19}$ and 2 for the blocks $B_{20}$ and $B_{21}$ as shown in FIG. 11C. A block $B_{16}$ corresponds to the example depicted in FIGS. 4 and 5 where $P_0=7$, $P_1=4$ and $P_2=12$.

Figures 12, 13:
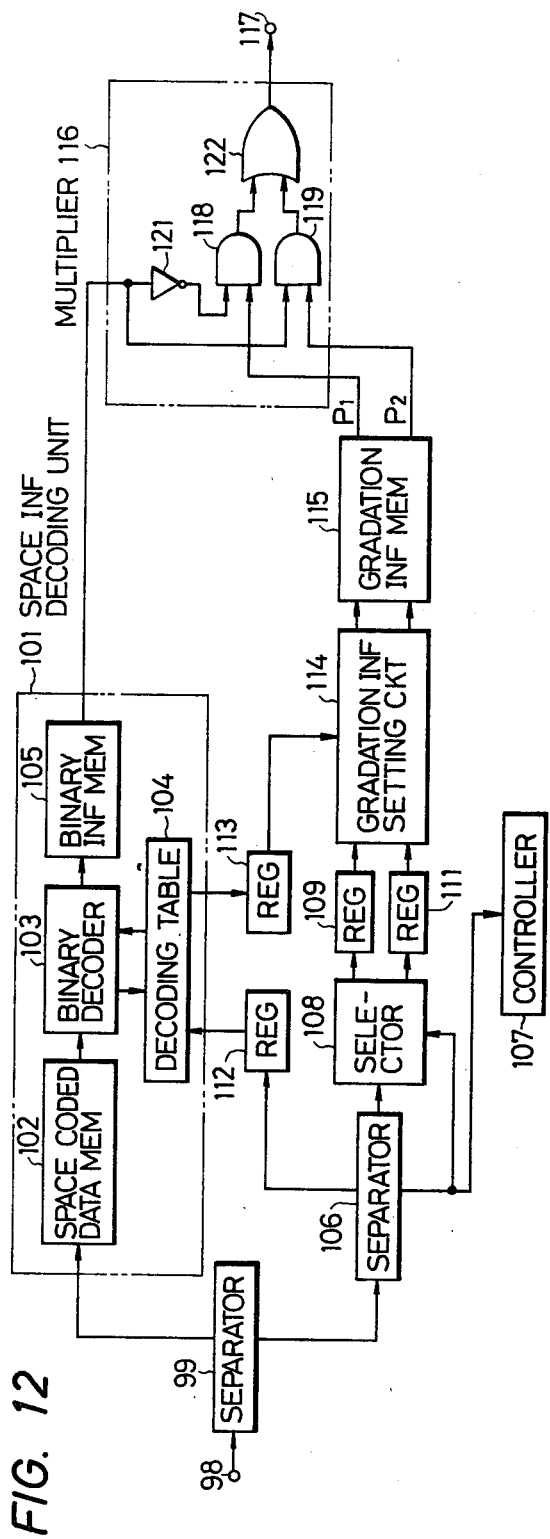
FIG. 12 is a block diagram illustrating an example of gray scale facsimile signal decoding equipment of the present invention.
FIG. 13 is a diagram showing decoded picture elements of the block depicted in FIG. 4.

Next, a description will be given, with reference to FIG. 12, of an example of the decoding of the coded gray scale facsimile signal obtained as described above. From an input terminal 98 is inputted the gray scale facsimile coded data shown in FIG. 8 to a separator 99, wherein the switching code 53 is detected to separate the data into the gradation coded data 52 and the space coded data 54. The thus separated space coded data 54 is stored in a space coded data memory 102 of a space information decoding unit 101. The space information decoding unit 101 may be of the same construction as a decoding unit employed in conventional binary facsimile receivers. The space coded data read out from the space coded data memory 102 is decoded by a binary decoder 103 while referring to a decoding table 104 and the decoded space information is stored in a binary information memory 105. The binary decoder 103 and the decoding table 104 may be those used in the prior art for decoding the modified Huffman code in the case where the information was encoded into the modified Huffman code by the binary encoder 36 and the code table 37 in the coding apparatus shown in FIG. 6.

The gradation coded data 52 separated by the separator 99 is further separated by a separator 106 into the identification code 43, the gradation information 44 and the block-run-length code 45 shown in FIGS. 7A and 7B. The identification code 45 is applied to a controller 107 and, at the same time, it is fed as a control signal to a selector 108. Regardless the identification code 43 is for the A or B type block, the selector 108 loads one separated gradation information, i.e. the data next to the identification code 43 in a register 109 and, in the case of the B type block, the following data is also loaded as a gradation code in a register 111. The separated block-run-length code 45 is stored in a register 112 and, by this block-run-length code 45, the decoding table 104 is read out and the block run length is stored in a register 113. In a gradation information setting circuit 114 the registers 109 and 111 are concurrently read out to derive therefrom the amount of data corresponding to the block run length stored in the register 113 and the outputs from the registers 109 and 111 are stored in a gradation information memory 115. Incidentally, in the case of the A type block, the register 111 is set to zero.

The binary information memory 105 and the gradation information memory 115 are simultaneously read out and their outputs are multiplied in a multiplier 116, the output from which is derived at an output terminal 117. In the case of the A type block, the gradation information being read out at that time is outputted from the multiplier 116 regardless of the content of the space information $\phi_{ij}$ of the block. In the case of the B type block, when the space information $\phi_{ij}$ read out is "0", the gradation information $P_1$ being read out at that time is outputted and when the space information $\phi_{ij}$ is "1", the gradation information $P_2$ being read out at that time is outputted. In the multiplier 116, for instance, the gradation information $P_1$ and $P_2$ concurrently read out are applied to AND circuits 118 and 119, respectively. In the case of the A type block, the gradation information read out is provided to the AND circuit 118 and "0" is fed to the AND circuit 119. The space information $\phi_{ij}$ is applied directly to the AND circuit 119 and, at the same time, it is inverted by an inverter 121 and then supplied to the AND circuit 118. The outputs from the AND circuits 118 and 119 are OR'ed by an OR circuit 122 and the OR'ed output therefrom is provided as the output from the multiplier 116. In this case, the multiplier 116 performs digital processing and the output at the terminal 117 is converted by a D-A converter into an analog signal, which is supplied as a record signal for a facsimile recorder capable of recording the gray scale facsimile signal. In FIG. 12 the respective parts are placed under the control of the controller 107.

For example, in the case of the block depicted in FIG. 4, the decoded output of the space information obtained by the abovesaid decoding operation is such as shown in FIG. 5. The decoded gradation information $P_1$ and $P_2$ are 4 and 12, respectively, and the picture elements of the space information "0" and "1" are decoded to gradations 4 and 12, respectively, as shown in FIG. 13.

Figure 14:
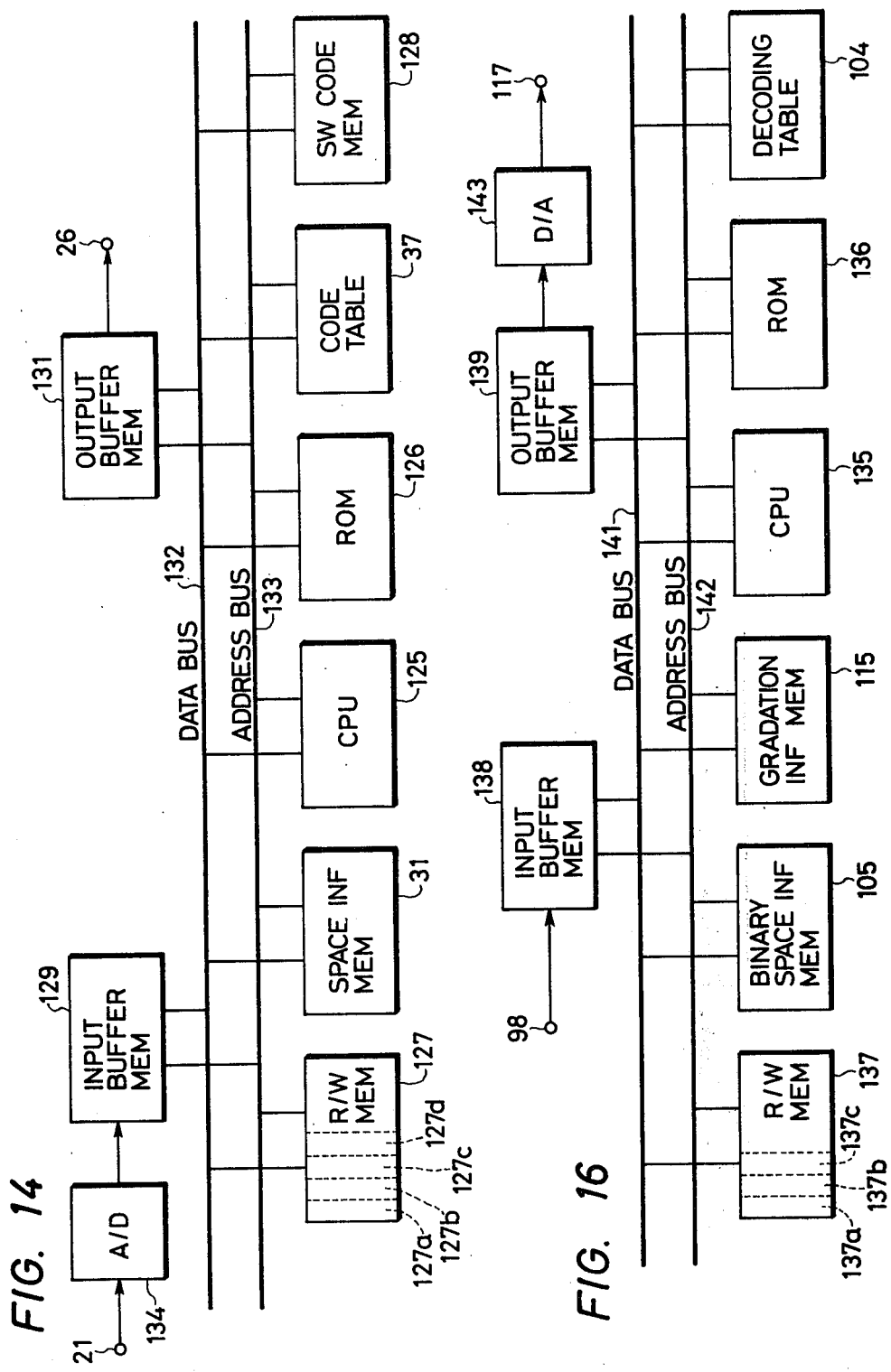
FIG. 14 is a block diagram illustrating an example of the gray scale facsimile signal processing equipment of the present invention arranged to perform processing under program control.

The coding and decoding operations described above can be carried out by the interpretation and execution of a program. A description will be given, with reference to FIG. 14, of an example of the coding operation. A central processor, i.e. what is called a CPU 125, reads out a read-only program memory 126 having stored therein a program and interprets and executes the program to perform the coding operation. In addition to the CPU 125 and the program memory 126, a read-/write memory 127, the space information memory 31, a code table 37, a switching code memory 128, an input buffer memory 129 and an output buffer memory 131 are respectively connected to a data bus 132 and an address bus 133. The CPU 125 accesses each of the respective parts via the address bus 133 to transmit and receive data between the CPU 125 and the accessed part via the data bus 132. The gray scale facsimile signal from the input terminal 21 is applied to an A-D converter 134, wherein the picture element signals are each coded into, for instance, a four-bit digital code, which is stored in the input buffer memory 129. It can be known in the CPU 125 which picture element signal of each main scanning line of the facsimile signal is stored at which address of the input buffer memory 129.

Figure 15:
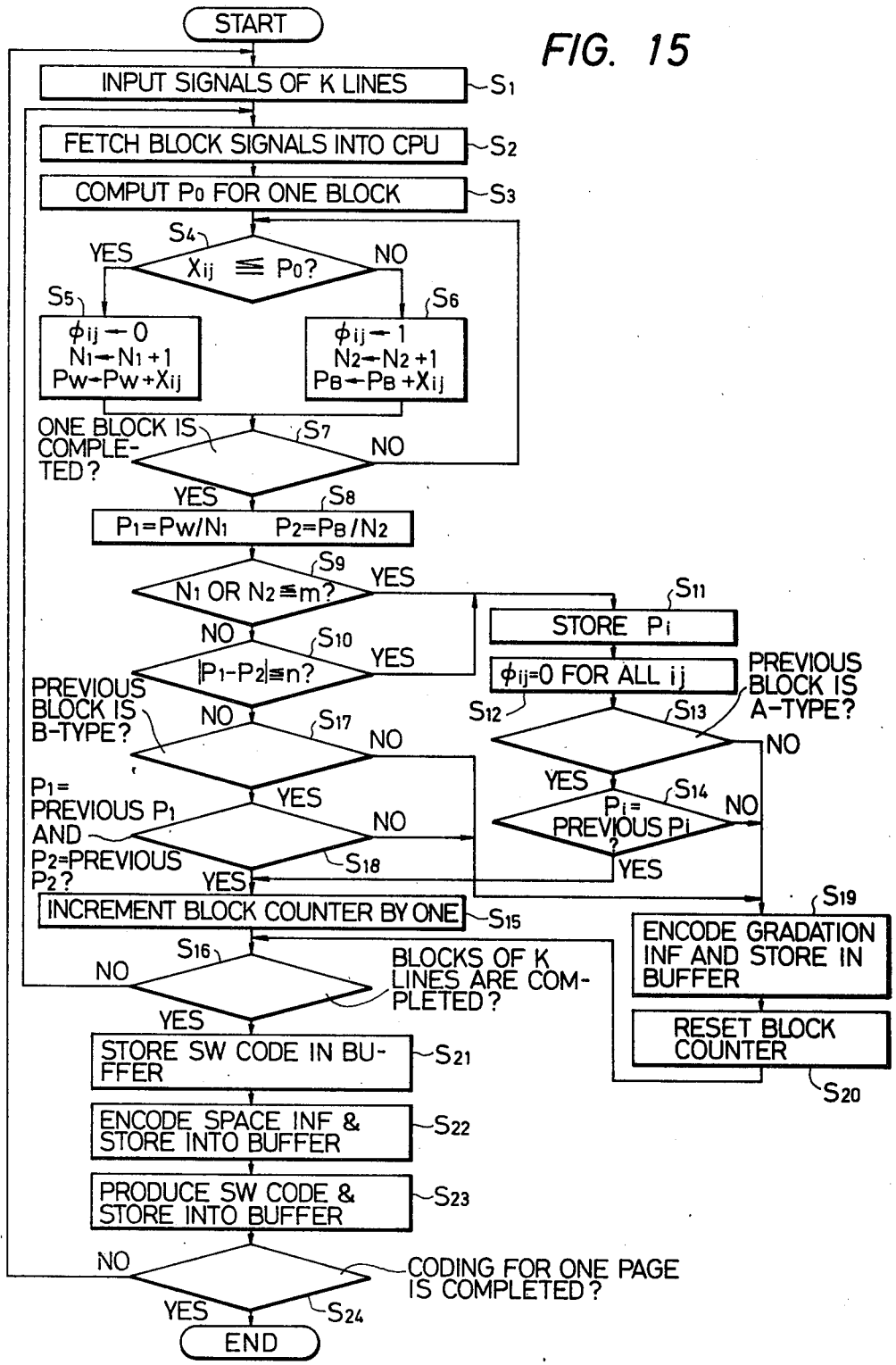
FIG. 15 is a flowchart showing an example of the operation of the equipment depicted in FIG. 14.

Upon commanding the CPU 125 to start processing, gray scale facsimile signals of the scanning lines (K=4) forming one block are inputted from the input buffer memory 129 into a predetermined area of a memory of the CPU 125 or the memory 127 in the order of scanning of the original picture in a step $S_1$ as shown in FIG. 15. In the next step $S_2$ the inputted half-tone facsimile signals are loaded for each block into the CPU 125 along the direction of main scanning. In a step $S_3$ the mean gradation $P_0$ of the loaded signals of one-block is computed and stored in a general register of the CPU 125. In a step $S_4$ each picture element signal $x_{ij}$ of the block signal is decided as to whether $x_{ij} \leq P_0$. If $x_{ij} \leq P_0$, the operation proceeds to a step $S_5$, in which the space information $\phi_{ij}$ is set to "0" and stored in the space information memory 31. At the same time, a $P_1$ counter in the CPU 125 is incremented by one and the picture element signal $x_{ij}$ is added to the content $P_W$ of a $P_1$ accumulating register, the added result being stored therein. If not $x_{ij} \leq P_0$, the operation proceeds to a step $S_6$, in which the space information $\phi_{ij}$ is set to "1" and stored in the space information memory 31. At the same time, a $P_2$ counter in the CPU 125 is incremented by one and the picture element signal $x_{ij}$ is added to the content $P_B$ of a $P_2$ accumulating register, the added result being stored therein. After completion of processing of either the step $S_5$ or $S_6$, a block picture element counter 127a is incremented by one in a step $S_7$ and, at the same time, it is checked whether the count value of the counter 127a has become equal to the number of picture elements K×L of the block, that is, whether processing of one block has been completed. The block picture element counter 127a is provided, for instance, in a portion of the area of the memory 127. In the event that the processing of one block has not been completed in the step $S_7$, the operation goes back to the step $S_4$.

When the processing of one block has been completed in the step $S_7$, the operation proceeds to a step $S_8$, in which the content $P_W$ of the $P_1$ accumulating register is divided by the count value $N_1$ of the $P_1$ counter in the CPU 125 to obtain the mean gradation information $P_1$ and the content $P_B$ of the $P_2$ accumulating register is similarly divided by the count value $N_2$ of the $P_2$ counter to obtain the mean gradation information $P_2$. In a step $S_9$ it is checked whether $N_1 \leq m$ or whether $N_2 \leq m$ and if not, it is decided in a step $S_{10}$ whether $|P_1 - P_2| \leq n$. When the condition is satisfied in either steps $S_9$ and $S_{10}$, the operation proceeds to a step $S_{11}$, in which the corresponding gradation information $P_i$ (i=0, 1, 2) is stored in a gradation register. Next, in a step $S_{12}$ the space information $\phi_{ij}$ corresponding to the block at that time is entirely read out from the space information memory 31 and all the information is set to "0", thereafter being stored again in the memory 31. In the next step $S_{13}$ it is checked whether the previous block is the A type or not, in the case of the A type block, it is checked in a step $S_{14}$ whether the gradation information of the previous block is equal to the gradation information $P_i$ of the present block determined in the step $S_{11}$. If it is, the operation proceeds to a step $S_{15}$, in which a block counter 127b advances by one. The counter 127b is also provided in a portion of the memory 127.

Next, a block number counter 127c advances by one in a step $S_{16}$ and it is checked whether the processing has been done by the blocks of K scanning lines. The block number counter 127c is also provided in the memory 127. When the processing of the blocks of K scanning lines has not been completed, the operation returns to the step $S_2$, in which the next block signal is inputted to the CPU 125 and the same processing as described above is performed.

In the case where the condition $|P_1 - P_2| \leq n$ is not satisfied in the step $S_{10}$, the operation proceeds to a step $S_{17}$, in which it is checked whether the block is the immediately preceding one or the B type one. In the case of the B type block, it is checked in a step $S_{18}$ whether the gradation information $P_1$ and $P_2$ of the immediately preceding block are equal to the gradation information $P_1$ and $P_2$ obtained in the step $S_8$. If so, the operation proceeds to the step $S_{15}$. Where the decision result is negative in any one of the steps $S_{13}$, $S_{14}$, $S_{17}$ and $S_{18}$, the operation proceeds to a step $S_{19}$, in which is obtained gradation coded data composed of the identification code indicating the type (A or B) of the immediately preceding block, the gradation information $P_i$ or $P_1$ and $P_2$ of the immediately preceding block and the content of the block counter 127b, i.e. a code corresponding to the block run length obtained from the code table 37, and the gradation coded data is stored in the output buffer memory 131. Then, the content of the block counter 127b is reset in a step $S_{20}$, which is followed by the step $S_{16}$.

When the end of processing for the blocks corresponding to K scanning lines has been detected in the step $S_{16}$, the operation proceeds to a step $S_{21}$, in which the switching code is brought from the switching code generator 128 into the output buffer memory 131, and then the operation proceeds to a step $S_{22}$. In the step $S_{22}$ the space information in the space information memory 131 is detected and encoded by the same method as that for encoding the conventional binary facsimile signal into a binary code, and the thus encoded space information is stored in the output buffer memory 131. After encoding the space information of the blocks corresponding to K scanning lines, a switching code is generated by the code generator 128 and stored in the output buffer memory 131 in a step $S_{23}$. Next, in a step $S_{24}$ a scanning line counter 127d is incremented by four (=K) and it is checked from the content of the counter 127d whether processing of one picture has been completed. If not, the operation returns to the step $S_1$ and facsimile signals of the following four (=K) scanning lines are inputted. When it has been detected in the step $S_{24}$ that processing for one picture had been completed, the coding operation comes to an end. The scanning line counter 127d can also be provided in a portion of the memory 127. At the start of the operation initialization is performed, that is, the counters 127a, 127b, 127c and 127d are reset to zero. The output buffer memory 131 is read out at a fixed rate and its output is delivered out, for example, on a transmission line.

Next, a description will be given, with reference to FIGS. 16 and 17, of the decoding operation under program control. The decoding table 104, the binary information memory 105, the gradation information memory 115, a central processor or what is called a CPU 135, a program memory 136, a read and write memory 137, an input buffer memory 138 and an output buffer memory 139 are respectively connected to a data bus 141 and an address bus 142. The CPU 135 performs decoding processing by reading out a program from the program memory 136 and interpreting and executing the program. The coded data is stored in the input buffer memory 138 via the input terminal 98. In this case, the switching code 53 leads the coded data and is followed by the gradation coded data 52. When the decoding operation has been started, the CPU 135 sequentially reads out the input buffer memory 138 and detects the switching code 53 in a step $S_1$ in FIG. 17 and, in a step $S_2$, the CPU 135 decides by itself whether the data to be read out next is the gradation coded data. In the case of the gradation coded data, the identification code 43 is detected in a step $S_3$ and, in a step $S_4$, it is checked whether the identification code 43 indicates the A type block. In the case of the A type block, the gradation information $P_i$ (i=0, 1, 2) alone is stored in a gradation register in a step $S_5$. In the event that the identification code does not indicate the A type block, the gradation information $P_1$ and $P_2$ are stored in the gradation register in a step $S_6$. After the step $S_5$ or $S_6$, the block-run-length code data 45 is inputted and, in a step $S_8$, it is decoded into a continuous block run length while referring to the decoding table 104. The decoded block run length is set in a block run-length counter 137a in a step $S_9$. As the counter 137a is used a part of the memory 137. In a step $S_{10}$, the gradation information $P_i$ or $P_1$ and $P_2$ obtained in the step $S_5$ or $S_6$ are stored in the gradation information memory 115 repeatedly by the number set in the block-run-length counter 137a. After this, a block counter 137b is incremented by the number set in the counter 137a and it is checked in a step $S_{11}$ whether the count value of the block counter 137b has reached the number of blocks corresponding to K scanning lines and, at the same time, the block-run-length counter 137a is reset. In the case where it has been detected in the step $S_{11}$ that the number of blocks corresponding to K scanning lines had not been reached, the operation returns to the step $S_3$, in which the coded data is fetched from the input buffer memory 138 and subjected to the same processing as described above.

When it has been detected in the step $S_{11}$ that processing for the blocks corresponding to K scanning lines had been finished, the operation returns to the step $S_1$, in which data is fetched from the input buffer memory 138. If it is decided in the step $S_2$ that the next processing is not for the gradation coded data 52, the operation proceeds to a step $S_{12}$, in which the space coded data 54 is fetched from the input buffer memory 138. In a step $S_{13}$ the space coded data 54 is fetched from the input buffer memory 138 and decoded into the space information while referring to the decoding table 104 and, in a step $S_{14}$, the space information thus decoded is stored in the space information memory 105. Upon each decoding of the space information for one scanning line, the counter 137b advances by one in a step $S_{15}$ and it is checked whether its count value has reached the number of blocks corresponding to K scanning lines. If not, the operation returns to the step $S_{12}$, in which the next space coded data is inputted to be subjected to the same processing as described above.

If it is detected in the step $S_{15}$ that the count value of the counter 137b has reached the number of blocks corresponding to K scanning lines, the space information memory 105 and the gradation information memory 115 are simultaneously read out in a step $S_{16}$ and the space and the gradation information thus read out are multiplied as described previously in respect of the multiplier 116 in FIG. 12. The multiplied output is stored in the output buffer memory 139 in a step $S_{17}$. Upon each completion of readout of the memories 105 and 115, a scanning line counter 137c advances by K in a step $S_{18}$ and it is checked whether the count content of the counter 137c has reached the number of scanning lines of the original, i.e. whether the decoding of one page of the original has been completed. If not, the processing returns to the step $S_1$, in which to detect the switching code, initiating the decoding of the next gradation coded data. When it has been detected in the step $S_{18}$ that the decoding of one page has been completed, the decoding processing comes to an end. Incidentally, the output buffer memory 137 is read out, for example, in synchronism with a recorder and the gradation information read out from the memory 137 is converted by the D-A converter 143 into an analog signal, which is supplied via the terminal 117 to the recorder. The counters 137a, 137b and 137c are preset by an initializing program for starting the decoding.

Figure 17:
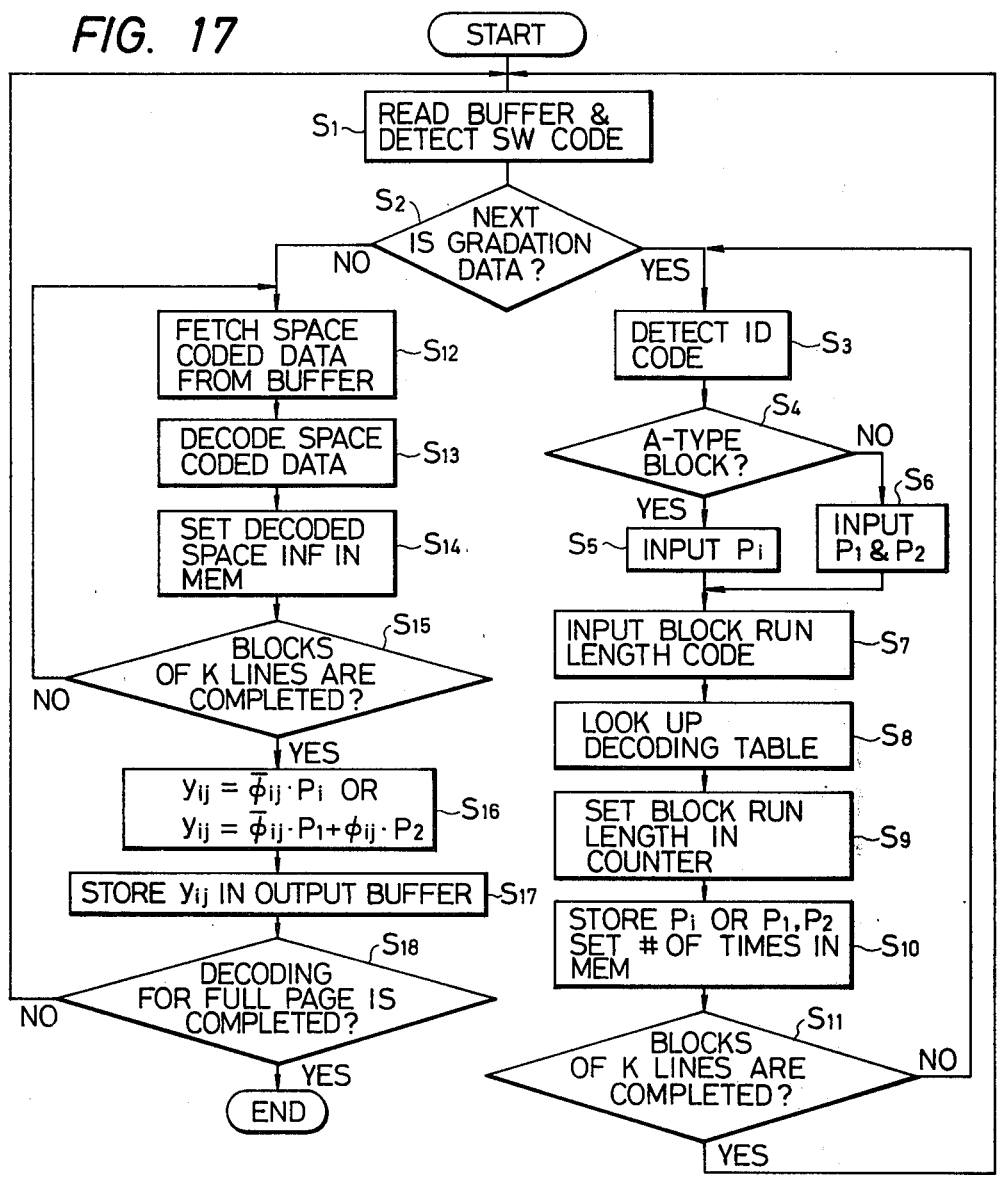
FIG. 17 is a flowchart showing an example of the operation of the equipment depicted in FIG. 16.
Figure 18:
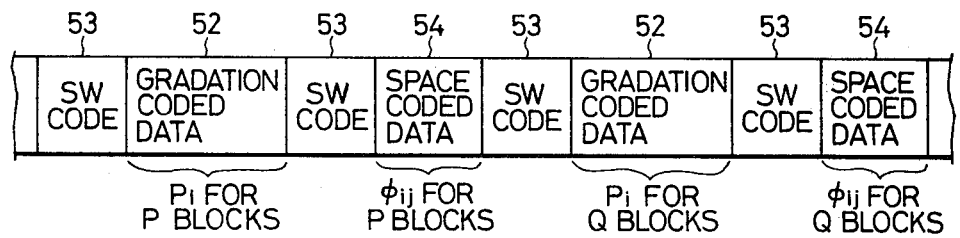
FIG. 18 is a diagram showing another example of coded data.

While in FIGS. 15 and 17 the switching code 53 is inserted every predetermined number of blocks corresponding to K scanning lines, it is also possible to insert the switching code 53 every appropriate number of blocks in the coding, for example, as shown in FIG. 18, in which there are successively arranged the gradation coded data 52 of P blocks, the switching code 53, the space coded data 54, the switching code 53, the gradation coded data 52 of Q blocks, the switching code 53, the space coded data 54 of Q blocks and so on. When to perform the decoding by software in such a case, each of the decisions in the steps $S_{11}$ and $S_{15}$ is replaced by decision whether the next input data is the switching code 53 or not. If not, the processing returns to the steps $S_3$ and $S_{12}$, respectively, whereas, in the case of the switching code 53, the step $S_{11}$ is followed by the step $S_{12}$ and the step $S_{15}$ is followed by the step $S_{16}$. Furthermore, by adding the switching code 53 with a sign indicating whether the following coded data is the gradation coded data 52 or the space coded data 54, the decoding operation will be facilitated. In the case of switching the gradation coded data 52 and the space coded data 54 from each other every predetermined number of blocks at all times, the switching code 53 is omitted and the decoded number of blocks is counted on the decoding side and each time the count value reaches a predetermined value, it is checked whether the next data is the space coded data or the gradation coded data. In this case, if the delivery of the coded data starts with the space coded data 54, then the identification code 43 indicating the A or B type block can be omitted.

Figure 19:
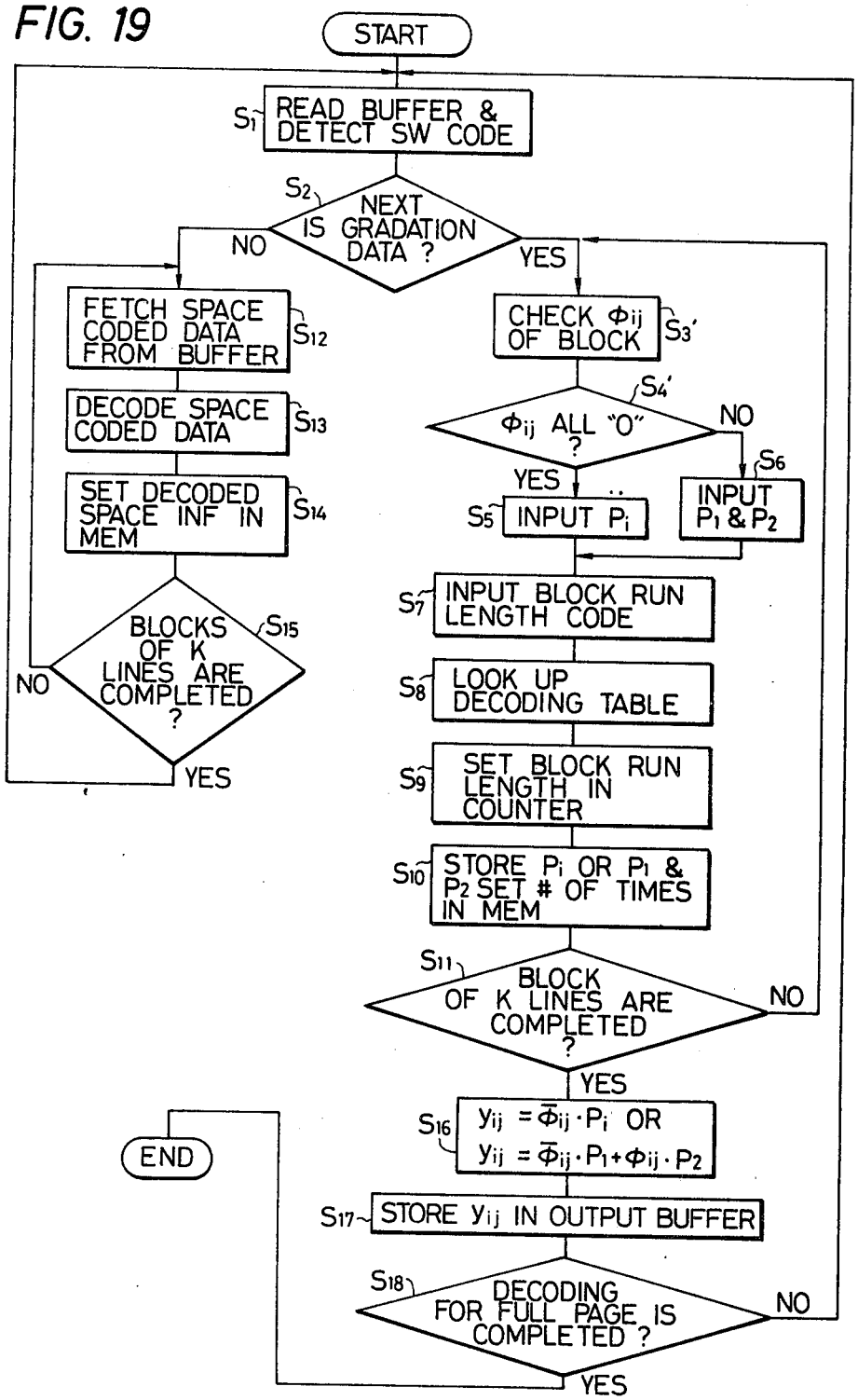
FIG. 19 is a flowchart showing, by way of example, the decoding operation in the case of A and B type block identification codes being omitted.

As description will be given, with reference to FIG. 19, of an example of the decoding in which the switching code 53 is employed but no identification code 43 is used. In FIG. 19 the steps corresponding to those in FIG. 17 are identified by the same reference numerals. In this case, decoding starts with the space coded data 54, which is processed sequentially in the order $S_1$-$S_2$-$S_{12}$-$S_{13}$-$S_{14}$-$S_{15}$. When it is detected in the step $S_{15}$ that the space coded data 54 of a predetermined number of blocks have all been decoded, decoding of the gradation coded data 52 is started after the steps $S_1$ and $S_2$. In a step $S_3$, is checked the space information $\phi_{ij}$ of the block which was decoded first in the decoding of the preceding spaced coded data 54. In a step $S_4'$ it is checked whether the space information $\phi_{ij}$ of the block is all "0" or not. In the case of all "0", it is decided that the block is the A type and, if the information contains "1", the block is decided as the B type, after which the processing proceeds to the step $S_5$ or $S_6$ accordingly. Thereafter, the processing of the steps $S_7$, $S_8$, $S_9$, $S_{10}$ and $S_{11}$ is performed sequentially as is the case with the processing illustrated in FIG. 17. In the event that the operation has returned to the step S3', the space information of the block is checked in the step S4' which block is spaced by the block run length set in the step S9 from the block having its space information $\phi_{ij}$ previously checked in the step S4'. Thereafter, the same processing as described previously is carried out and when it is detected in the step S11 that the decoding of the gradation coded data 52 for a predetermined number of blocks has been completed, the processing proceeds to the step S16. The other procedures are common to those in the case of FIG. 17.

Figure 20A:
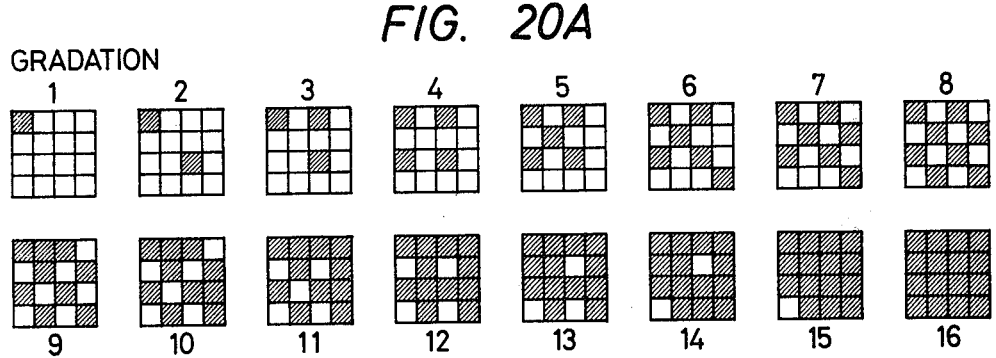
FIGS. 20A and 20B are diagrams respectively showing examples of dot patterns.
Figure 20B:
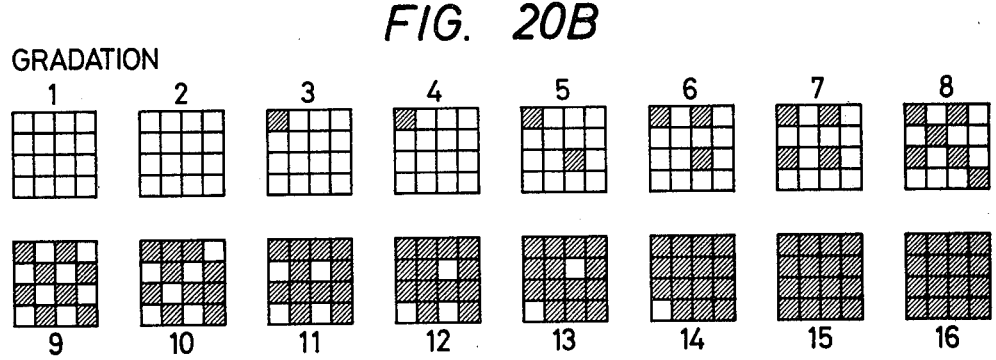
Figure 21:
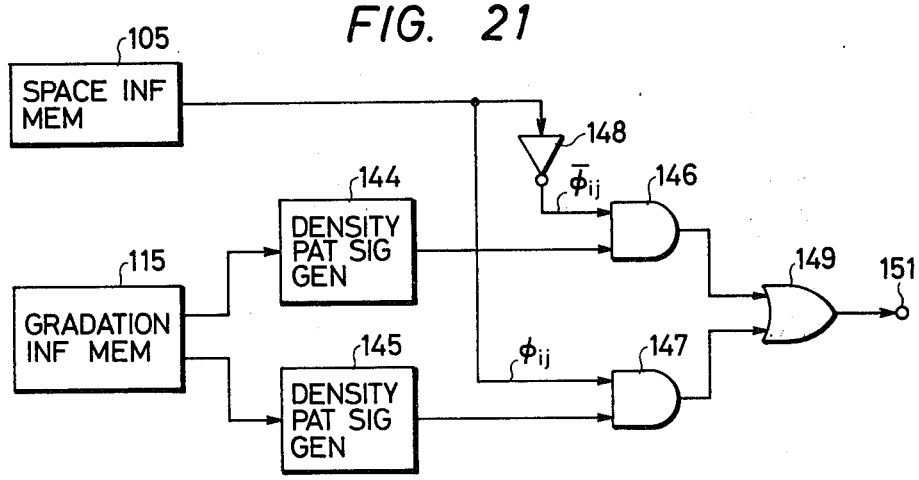
FIG. 21 is a block diagram illustrating an example of half-tone signal reconstructing equipment for the gray scale facsimile signal according to the present invention.

With the use of the coded data, it is possible to reproduce a half tone through utilization of reproducing equipment that is incapable of reproducing gray scale picture elements but able to reproduce binary picture elements alone. That is to say, a dot pattern is generated which has a mean density corresponding to each decoded gradation information. The dot pattern is composed of the same number of picture elements K×L as those of the coded block and the mean density of each picture element is caused to correspond to the gradation information. FIGS. 20A and 20B show, by way of example, dot patterns, for instance, in the case where the block has picture elements K=4, L=4 and the number of gradation levels is 16. In any case, as the gradation level approaches 16 from 1, the number of black picture elements increases and, at the highest level, all the picture elements are black. The dot patterns of FIG. 20A are employed in the case where the contrast of a picture undergoes gentle variations, while the density patterns of FIG. 20B are used when the contrast of the picture undergoes abrupt changes. FIG. 21 illustrates, by way of example, the arrangement for obtaining a half-tone signal through the use of such dot patterns. The space information memory 105 and the gradation information memory 115 are those described previously in respect of FIG. 12 and dot pattern signal generators 144 and 145 are driven by the gradation information $P_i$ (i=0, 1, 2) or $P_1$ and $P_2$ that are read out from the gradation information memory 115. The dot pattern signal generators 144 and 145 respectively have stored therein, for instance, 16 dot patterns corresponding the gradation levels 1 to 16 shown in FIG. 20A and generate a dot pattern signal in accordance with inputted gradation information. For instance, when the gradation information $P_1$ is 3, a dot pattern having the gradation level 3 shown in FIG. 20A is produced as a white-black binary dot pattern signal in the same order as the space information $\phi_{ij}$. When "0" has been applied to the dot pattern signal generator 145, it yields a dot pattern signal composed of 16 "0"s. The dot pattern signals from the dot pattern signal generators 144 and 145 are provided to AND circuits 146 and 147, respectively. To the AND circuit 147 is supplied the space information $\phi_{ij}$ read out from the space information memory 105. The space information $\phi_{ij}$ is also inverted by an inverter 148 and applied to the AND circuit 146. The outputs from the AND circuits 146 and 147 are fed to an OR circuit 149, the output from which is derived at an output terminal 151. The generation of the dot pattern signal by the dot pattern signal generators 144 and 145 takes place in synchronism with the readout of the space information memory 105. With such an arrangement, a high density portion of the original image is given a high density dot pattern and a low density portion a low density dot pattern to provide a density distribution which is substantially equal to that of the original image as a whole. Thus a half tone can be obtained although resolution may be lowered to a certain degree.

In the foregoing, the gradation information is coded in accordance with the block run length and, as the code table for the coding of block run length, use is made of the code table employed for the binary coding of the space information, but it is also possible to provide a code table independently. Especially in such a case, a code table can be employed which allows more efficient coding. That is to say, the distribution of the block run length in a typical gray scale picture is such as illustrated in FIG. 22 in which the A type block is indicated by the curve 152 and the B type block the curve 153. In FIG. 22 the abscissa represents the block run length and the ordinate the frequency of occurrence. The A type and B type blocks are both distributed substantially in the manner of an expotential function. For such distribution a modified Wyle's coding (see, for example, H. Wyle et al., IRE Trans. CS 9-3, pp 215, 1961, "Reduced-Time Facsimile Transmission by Digital Coding"), such as shown in FIG. 23, is considered optimum.

The coding of the gradation information is not limited specifically to the coding of the run length of the blocks of the same gradation information but may also be effected in such a manner as follows: As shown in FIG. 24, in the case where the representative gradation information $P_i$ (i=0, 1, 2) is only one and equal to only one representative gradation information $P_i$' of the immediately preceding block, an identification code "0" is provided. In the case where the representative gradation information is $P_i$ alone and the immediately preceding block has also one representative gradation information but different from the abovesaid $P_i$, an identification code "10" is added for indicating the difference in the representative gradation information and the one representative gradation information $P_i$ is added next to the abovesaid identification code. Where the representative gradation information is $P_1$ and $P_2$ and they differ from the gradation information of the immediately preceding block, an identification code "111" for indicating the difference is added, which is followed by the representative gradation information $P_1$ and $P_2$. FIG. 25 shows an example of this coding applied to the gradation information depicted in FIG. 11B.

It is also possible to send one or two pieces of representative gradation information for each block without coding the gradation information as described previously. The mean gradation information $P_0$ ($P_1$, $P_2$) need not always be an arithmetic means $$\frac{1}{K \times L} \Sigma x_{ij}$$

of picture element signals but may also be a square mean $$\frac{1}{K \times L} \sqrt{\Sigma x_{ij}^2} ,$$

for instance.

According to the coding method of the present invention described in the foregoing, a gray scale facsimile signal is divided into space information and gradation information and when the latter satisfies any one of $|P_1 - P_2| \leq n$, $N_1 \leq m$ and $N_2 \leq m$, only one piece of representative gradation information is provided.

Hence the coding efficiency is high. Especially in the case of providing one piece of representative gradation information, too, the space information $\phi_{ij}$ is made all "0s", which are generated by the number of picture elements of the block, so that the space information closely resembles conventional binary facsimile signals in statistical property. For instance, in the case where a combination of #1 chart of a gray scale photographic image standardized by Institute of Image and Electronics Engineers of Japan and CCITT #7 chart of the Japanese language was used as an original and facsimile signals were processed under the conditions that the block size was 4×4 picture elements, the number of gradation levels of each picture element signal was 16, m=2 and n=1. As a result, the frequency of occurrence of the white "0" run length was such as indicated by the curve 154 in FIG. 26 and the frequency of occurrence of the black "1" run length was such as indicated by the curve 155. In FIG. 26, the abscissa represents the run length and the ordinate the frequency of occurrence. In FIG. 26 there is not shown the frequency of occurrence for a region of large run lengths. It will be appreciated that these curves respectively bear resemblance to those in FIGS. 27A and 27B which respectively show distribution of white and black run lengths when the picture element signals of the aforementioned #7 chart were rendered into binary facsimile signals. Accordingly, binary coding of the space information $\phi_{ij}$ using the modified Huffman code or modified Read code can be effected with high efficiency. Hence coding of the gray scale facsimile signal is possible by adding, for instance, the space-gradation information computing unit 22, the gradation information coding unit 24 and the combining unit 25 shown in FIG. 6 to prior art binary facsimile coding equipment. The same is true of the decoding. Accordingly, it is easy to obtain gray scale facsimile equipment by optionally adding the abovesaid units to conventional facsimile equipment. Also in the case of using new facsimile equipment, conventional binary coder and encoder can be employed for the gray scale facsimile equipment, which is therefore economical by that.

In the gray scale facsimile, an increase in the number of gradation levels causes a problem of background noise but, in the case of $|P_1-P_2|\leq n$, by using only one piece of representative gradation information and making the space information $\phi_{ij}$ all "0" as described previously, it is possible to suppress the background noise which occurs very frequently at random; hence, a reproduced picture of good quality can be obtained. A preferable value of n depends largely on the maximal number of gradation levels. For example, in the cases of 16 and 64 gradation levels, 1 and 3 were preferable values, respectively. In this way, the number of representative gradation information can be decreased, enhancing the compression effect by that. In the aforementioned case of $N_1\leq m$ or $N_2\leq m$, by using only one piece of representative gradation information and making the space information $\phi_{ij}$ all "0", it is possible to suppress small noises which occur locally and, in addition, the coding efficiency can also be raised. A preferred value of m depends on the block size K×L. When the maximal number of gradation levels was 16, the preferable value of m in the case of the block size 4×4 was 2. In any case, the probability of occurrence of blocks which can be represented by one gradation increases by setting n and m and the picture is simplified, reducing the number of codes generated. In the case where the maximal number of gradation levels was 16 and the block size was 4×4, n=1 and m=2 were optimal in terms of deterioration of the picture quality and the number of codes generated. In the case of A-type blocks the space information $\phi_{ij}$ may also be made all "1" but, in the binary facsimile, large white "0" run lengths usually occur more frequently than large block "1" run lengths, so that to make the space information $\phi_{ij}$ all "0" is more suitable for the application of the modified Huffman or modified Read code. The decision processing may be omitted either for $|P_1-P_2|\leq n$ or for $N_1\leq m$ and $N_2\leq m$. Furthermore, it is desirable to adaptively change n and m to preferred values in accordance with the maximal number of gradation levels.

The gradation information is generated in a state similar, as a whole, to that in which the binary facsimile signal is generated when the picture elements of an original picture are enlarged. Hence it can be coded and decoded using the code table and the decoding table for the space information. This allows efficient coding and decoding and is highly economical. The efficiency of such coding is higher than in the prior art. Table 1 shows the coding efficiency of various coding methods. It will be appreciated from the table that the quantity of code in the present invention is about 1/6 and about ¼ those needed in conventional predictive coding and block coding methods, respectively.

TABLE 1

| Method | Mean Code Length (bit/picture element) |
|---|---|
| Predictive coding method | 1.5~2.0 |
| Bit plane method | 2~3 |
| Half-tone indicating method | 0.3~1.0 |
| Block coding method | ~1 |
| This invention method | 0.25~0.30 |

Moreover, according to the present invention, it is possible to impart a half tone to a reproduced image by adding such a relatively simple arrangement as shown in FIG. 21 to reproducing equipment which is able to reproduce only a binary level. In addition, according to the present invention, the same coded data can be equally reproduced not only by a receiver for reproducing the gray scale but also by a receiver for the half tone; hence the same coding transmitter can be used in common to these two kinds of receivers. Also on the receiving side, the gradation information as well as the space information can be equally reproduced by the gray scale and the half tone reproducing receiver; this is very convenient for practical use.

It will be apparent that many modifications and variations may be effected without departing from the scope of the novel concepts of this invention.

We claim:

1. A method for processing a gray scale facsimile signal, comprising the steps of:

dividing the gray scale facsimile signal into a plurality of block signals, each block signal being a facsimile signal containing a gray scale component which corresponds to one of the blocks obtained by dividing an original picture of the facsimile signal into a plurality of blocks, each composed of a plurality of picture elements;

classifying picture element signals of each block signal into a high optical density and a low optical density group through the use of a threshold value and generating binary space information indicating which one of the two groups each picture element signal belongs to;

obtaining means gradation information of the high optical density group and mean gradation information of the low optical density group for each block signal and making the gradation of each block signal to be represented by the two pieces of gradation information;

making the gradation information of the block signal to be represented by one of the two pieces of gradation information in the case where the difference between the two pieces of gradation information of the block signal is smaller than a predetermined value and/or in the case where the number of picture element signals belonging to either one of the two groups is smaller than a predetermined value;

correcting the space information to space information having all the picture elements of the block signal belonging to one of the two groups in the case of the gradation information of the block signal being represented by one of the two pieces of gradation information;

coding the space information into a binary code corresponding to the order of occurrence of the picture element signals of the facsimile signal to obtain space coded data; and combining the space coded data and the representative gradation information into a series of coded data for output.

2. A method according to claim 1 which further comprises the step of coding the representative gradation information into a block run length code indicating the number of a series of block signals of the same representative gradation information and the representative gradation information to obtain gradation coded data, and wherein the gradation coded data is combined with the space coded data in said combining step.

3. A method according to claim 2 wherein the block run length code is obtained by referring to a code table for space information coding use.

4. A method according to claim 2 wherein the block run length code is obtained by referring to a code table for the exclusive use thereof which is different from a code table for space information coding use.

5. A method according to claim 1 which further comprises the step of obtaining gradation coded data by coding the representative gradation information of the block signal into only an identification code indicating that the representative gradation information of the block signal is the same as that of an immediately preceding block signal in the case of the both block signals being common in representative gradation information to each other and by coding the representative gradation information of the block signal into an identification code indicating that the representative gradation information of the block signal differs from that of the immediately preceding block signal and the representative gradation information in the case of the both block signals being different in the representative gradation information from each other, and wherein the gradation coded data is combined with the space coded data.

6. A method according to claim 1, 2 or 5 which further comprises the step of generating a switching code, and wherein the space coded data and the representative gradation information (the gradation coded data) are combined while switching them alternately every plurality of block signals and the switching code is inserted between adjacent ones of the space coded data and the representative gradation information each time they are switched from each other.

7. A method according to claim 1 or 2 which further comprises the step of generating an identification code, and wherein the identification code is added to the representative gradation information for indicating whether the representative gradation information is one or two pieces of information.

8. A method according to claim 1, 2 or 5 wherein the corrected space information has all of the picture element signals corrected to a value corresponding to white in the original picture.

9. A method for processing a gray scale facsimile signal, wherein input coded data is composed of space coded data and gradation coded data; the space coded data signal is obtained by coding binary space information, the gray scale facsimile signal being divided into a plurality of block signals, each composed of a plurality of picture element signals, the picture element signals of each block signals being classified into two groups using one threshold value, and the binary space information indicating which one of the two groups each picture element signal belongs to; and the gradation coded data is obtained by coding gradation information indicating the mean of the picture element signals of one of the groups for each block signal and gradation information indicating the mean of the picture element signals of the other group for each block signal, the block signal being represented by a piece of gradation information and given such a value that all the space information of the block signal is mode to equal either one of the groups when the difference between the two pieces of gradation information of each block signal is smaller than a predetermined value and/or when the number of picture element signals of either one of the two groups is smaller than a predetermined value; the method comprising the steps of:

dividing the input coded data into the space coded data and the gradation coded data;

decoding the space coded data into the space information;

decoding the gradation coded data into the gradation information of each block signal; and multiplying the decoded gradation information and the decoded space information for each corresponding block signal to reproduce picture element information, obtaining the gray scale facsimile signal.

10. A method for processing a gray scale facsimile signal, wherein input coded data is composed of space coded data and gradation coded data; the spaced coded data signal is obtained by coding binary space information, the gray scale facsimile signal being divided into a plurality of block signals, each composed of a plurality of picture element signals, the picture element signals of each block signal being classified into two groups using one threshold value, and the binary space information indicating which one of the two groups each picture element signal belongs to; and the gradation coded data is obtained by coding gradation information indicating the mean of the picture element signals of one of the groups for each block signal and gradation information indicating the mean of the picture element signals of the other group for each block signal; the block signal being represented by a piece of gradation information and given such a value that all the space information of the block signal is made to equal either one of the groups when the difference between the pieces of gradation information of each block signal is smaller than a predetermined value and/or when the number of picture element signals of either one of the two groups is smaller than a predetermined value; the method comprising the steps of:

dividing the input coded data into the space coded data and the gradation coded data;

decoding the space coded data into the space information;

decoding the gradation coded data into the gradation information of each block signal;

generating a dot pattern signal corresponding to the decoded gradation information, the dot pattern signal being composed of binary signals of the same number as the picture element signals of the block signal and the mean density of the binary signals being substantially equal to the gradation information; and multiplying the dot pattern signal and the decoded space information for each corresponding block signal to obtain a facsimile signal having a half-tone component.

11. Equipment for processing a gray scale facsimile signal comprising;

space-gradation information computing section including space information generating means supplied with the gray scale facsimile signal to divide it into a plurality of block signals, each composed of a plurality of picture element signals, to classify the picture element signals of each block signal into two groups using a threshold value and to generate space information indicating which one of the two groups each picture element signal belongs to; means for generating mean gradations of the picture element signals of the two groups as representative gradation information of the block signal; deciding means for detecting whether the difference between the two pieces of representative gradation information is smaller than a predetermined value and/or whether the number of picture element signals belonging to either one of the two groups is smaller than a predetermined value, and means for making the representative gradation information of the block signal to be one of the two pieces of gradation information and making all of the space information of the block signal equal to one of the two groups;

space information coding section for coding the space information from the space-gradation information computing section into a binary code by referring to a code table to obtain space coded data;

gradation information coding section for coding the gradation information from the space-gradation information computing section to obtain gradation coded data; and a combining section for combining the space coded data from the space information coding section with gradation coded data from the gradation information coding section into output coded data.

12. Equipment according to claim 11 wherein the space-gradation information computing section further includes a mean density calculator for calculating the mean density of each block signal for use as the threshold value, wherein the space information generating means is a comparator for comparing the threshold value with each picture element signal of the block signal to provide the compared output as space information; and the picture element signals of the corresponding block signal are selected by the output from the comparator and distributed to $P_1$ and $P_2$ calculators, the $P_1$ calculator computing one of the representative gradation information from the number of picture element signals inputted thereto and the sum of their levels, and the $P_2$ calculator computing the other representative gradation information from the number of picture element signals inputted thereto and the sum of their levels.

13. Equipment according to claim 11 or 12 wherein the gradation information coding section comprises means for comparing the representative gradation information of each block signal with the representative gradation information of an immediately preceding block signal, a block run length counter advancing by one upon each detection of coincidence by the comparing means, and a code table for outputting coded data corresponding to the content of the block run length counter upon detection of noncoincidence by the comparing means.

14. Equipment according to claim 11 or 12 wherein the space information coding section is a coding section for a binary facsimile signal.

* * * * *